United States Patent
Hakola et al.

(10) Patent No.: US 12,401,407 B2
(45) Date of Patent: Aug. 26, 2025

(54) FACILITATING EXPLICIT LATENCY MODE DETERMINATION IN BEAM SWITCHING

(71) Applicant: Nokia Technologies Oy, Espoo (FI)

(72) Inventors: Sami Hakola, Kempele (FI); Ilkka Keskitalo, Oulu (FI); Shashika Manosha Kapuruhamy Badalge, Oulu (FI); Juha Karjalainen, Sotkamo (FI); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 373 days.

(21) Appl. No.: 17/880,724

(22) Filed: Aug. 4, 2022

(65) Prior Publication Data

US 2023/0059284 A1    Feb. 23, 2023

Related U.S. Application Data

(60) Provisional application No. 63/234,570, filed on Aug. 18, 2021.

(51) Int. Cl.
| | | |
|---|---|---|
| H04B 7/0408 | (2017.01) | |
| H04B 7/204 | (2006.01) | |
| H04W 24/10 | (2009.01) | |
| H04W 72/04 | (2023.01) | |
| H04W 72/044 | (2023.01) | |

(52) U.S. Cl.
CPC ......... *H04W 72/046* (2013.01); *H04W 24/10* (2013.01)

(58) Field of Classification Search
CPC .... H04B 7/0695; H04B 7/088; H04B 7/0617; H04B 7/0626; H04B 7/0639; H04B 7/0408; H04B 7/024; H04B 7/0814; H04B 7/0632
See application file for complete search history.

(56) References Cited

U.S. PATENT DOCUMENTS

| | | | |
|---|---|---|---|
| 10,873,386 B2 | 12/2020 | Zhou et al. | |
| 2018/0167883 A1* | 6/2018 | Guo | H04B 7/0617 |
| 2018/0212651 A1* | 7/2018 | Li | H04B 7/0417 |
| 2019/0297648 A1* | 9/2019 | Nagaraja | H04B 7/063 |
| 2019/0341992 A1 | 11/2019 | Zhou et al. | |
| 2020/0296635 A1 | 9/2020 | Rastegardoost et al. | |
| 2021/0135734 A1* | 5/2021 | Abedini | H04B 7/0695 |
| 2021/0152235 A1* | 5/2021 | Zhou | H04W 72/53 |
| 2021/0226745 A1 | 7/2021 | Guo | |
| 2021/0250227 A1* | 8/2021 | Bai | H04W 36/305 |

(Continued)

OTHER PUBLICATIONS

"3rd Generation Partnership Project; Technical Specification Group Radio Access Network; NR; Requirements for support of radio resource management (Release 17)", 3GPP TS 38.133, V17.1.0, Mar. 2021, 2172 pages.

(Continued)

*Primary Examiner* — Sai Aung
(74) *Attorney, Agent, or Firm* — SQUIRE PATTON BOGGS (US) LLP

(57) ABSTRACT

Systems, methods, apparatuses, and computer program products for facilitating explicit latency mode determination in beam switching. One method may include receiving, by a user equipment, at least one beam switch command from at least one network entity. The user equipment may further determine at least one latency and switching mode, and perform beam switch based on the at least one latency and switching mode.

20 Claims, 6 Drawing Sheets

(56) References Cited

U.S. PATENT DOCUMENTS

| | | | | |
|---|---|---|---|---|
| 2023/0155660 A1* | 5/2023 | Zhang | ............... | H04B 7/0404 |
| | | | | 375/267 |
| 2023/0412238 A1* | 12/2023 | Tran | ............... | H04W 16/28 |
| 2024/0098826 A1* | 3/2024 | Awada | ............... | H04W 76/19 |

OTHER PUBLICATIONS

"3rd Generation Partnership Project; Technical Specification Group Radio Access Network; NR; Multiplexing and channel coding (Release 16)", 3GPP TS 38.212, V16.5.0, Mar. 2021, pp. 1-152.

"3rd Generation Partnership Project; Technical Specification Group Radio Access Network; NR; Physical layer procedures for control (Release 16)", 3GPP TS 38.213, V16.5.0, Mar. 2021, pp. 1-183.

"3rd Generation Partnership Project; Technical Specification Group Radio Access Network; NR; Physical layer procedures for data (Release 16)", 3GPP TS 38.214, V16.5.0, Mar. 2021, pp. 1-171.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"Moderator summary for multi-beam enhancement: proposal categorization", 3GPP TSG RAN WG1 #102-e, R1-2006985, Agenda: 8.1.1, Moderator (Samsung), Aug. 17-28, 2020, 27 pages.

* cited by examiner

ID EXPLICIT LATENCY MODE
FACILITATING EXPLICIT LATENCY MODE DETERMINATION IN BEAM SWITCHING

RELATED APPLICATION

This application claims priority to U.S. Provisional Application No. 63/234,570 filed Aug. 18, 2021 which is incorporated herein by reference in its entirety.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for facilitating explicit latency mode determination in beam switching.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a user equipment, at least one beam switch command from at least one network entity. The method may further include determining, by the user equipment, at least one latency and switching mode. The method may further include performing, by the user equipment, the determined at least one latency and switching mode.

In accordance with certain example embodiments, an apparatus may include means for receiving at least one beam switch command from at least one network entity. The apparatus may further include means for determining at least one latency and switching mode. The apparatus may further include means for performing the determined at least one latency and switching mode.

In accordance with various example embodiments, an apparatus may include at least one processor and at least one memory including computer program code. The at least one memory and the computer program code may be configured to, with the at least one processor, cause the apparatus to at least receive at least one beam switch command from at least one network entity. The at least one memory and the computer program code may be further configured to, with the at least one processor, cause the apparatus to at least determine at least one latency and switching mode. The at least one memory and the computer program code may be further configured to, with the at least one processor, cause the apparatus to at least perform the determined at least one latency and switching mode.

In accordance with some example embodiments, a non-transitory computer readable medium may be encoded with instructions that may, when executed in hardware, perform a method. The method may include receiving at least one beam switch command from at least one network entity. The method may further include determining at least one latency and switching mode. The method may further include performing the determined at least one latency and switching mode.

In accordance with certain example embodiments, a computer program product may perform a method. The method may include receiving at least one beam switch command from at least one network entity. The method may further include determining at least one latency and switching mode. The method may further include performing the determined at least one latency and switching mode.

In accordance with various example embodiments, an apparatus may include circuitry configured to receive at least one beam switch command from at least one network entity. The circuitry may further be configured to determine at least one latency and switching mode. The circuitry may further be configured to perform the determined at least one latency and switching mode.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for facilitating explicit latency mode determination in beam switching is not intended to limit the scope of certain example embodiments, but is instead representative of selected example embodiments.

In general, beam management defines a set of functionalities to assist a user equipment (UE) to set its receiving (RX) and transmitting (TX) beams for downlink receptions and uplink transmission, respectively. These functionalities can be categorized into four groups. The first group is beam indication, which may assist the UE to set its RX and TX beams properly for the reception of downlink (DL) and transmission of uplink (UL), respectively. The second group is Beam Acquisition, Measurements and Reporting, which may include procedures for providing the gNB with knowledge about feasible DL and UL beams for the UE. The third group includes beam recovery for rapid link reconfiguration against sudden blockages, i.e., fast re-alignment of gNB and UE beams. Finally, the fourth group is beam tracking and refinement, which may include a set of procedures to refine gNB and UE side beams.

Figure 1:
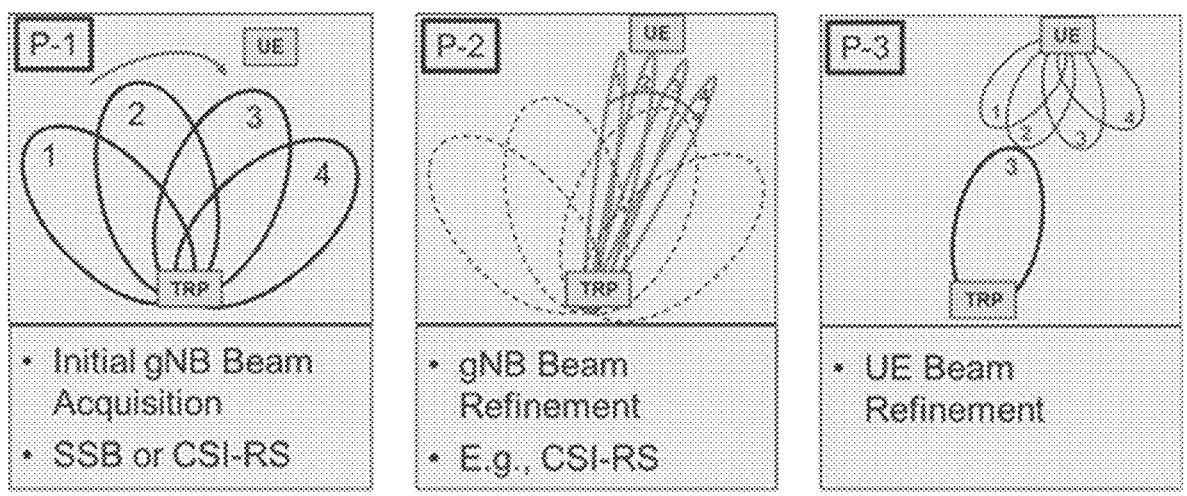
FIG. 1 illustrates example downlink beam management procedures.

As illustrated in FIG. 1, downlink beam management and beam acquisition, measurements, and reporting may include various beam management procedures supported within one or multiple transmission points (TRPs) of the serving cell. For example, the configuration in P-1 may be used to enable UE measurements on different TRP Tx beams to support the selection of TRP Tx beams/UE Rx beams. For beamforming at TRP, it may include an intra/inter-TRP Tx beam sweep from a set of different beams. Beamforming at the UE may include a UE Rx beam sweep from a set of different beams. Similarly, P-2 may be used to enable UE measurements on different TRP Tx beams to possibly change inter/intra-TRP Tx beams. This may use a smaller set of beams for beam refinement compared to P-1 as a special case of P-1. Finally, P-3 may be used to enable UE measurements on the same TRP Tx beams to change UE Rx beams when the UE uses beamforming.

Downlink beam indications may define a quasi-colocation (QCL) indication functionality. In general, in order to receive certain physical signals or physical channels, the UE may be configured with (or the UE implicitly determines) a source/reference signal (RS) that the UE has received and measured earlier. This RS may define how to set RX beams for the reception of the downlink (target) physical signal or channel to be received. A transmission coordination indication (TCI) framework may provide the UE with QCL characteristics for the target signal (to be received). The TCI framework may define configured TCI states that provide the UE with source RSs for determining QCL characteristics. Each TCI state may include at least one source RS that provides UE QCL TypeA (Doppler shift, Doppler spread, average delay, delay spread), TypeB (Doppler shift, Doppler spread), TypeC (Doppler shift, average delay) and/or TypeD (Spatial Rx parameter) parameters.

In uplink, the UE may be provided with a spatial relation info parameter providing a spatial source RS based on which the UE determines the uplink transmit beam. The spatial source RS may be a DL RS (SSB or CSI-RS) or UL RS sounding reference signal (SRS). For each physical uplink control channel (PUCCH) and SRS resource, the gNB may explicitly provide spatial source while PUSCH indirect indication is being provided. For example, physical uplink shared channel (PUSCH) may be scheduled using DCI format 0_0, where the spatial source may be the same as a certain PUCCH resource. Similarly, PUSCH may be scheduled using DCI format 0_1, where a spatial source may be the same as indicated SRS resources. One SRS resource may be indicated in a codebook based transmission scheme, while other SRS resources may be indicated in a non-codebook based transmission scheme.

A default spatial relation may be used for dedicated PUCCH/SRS (except SRS with usage='beamManagement' and SRS with usage='nonCodeBook' and configured with associated channel state information reference signal (CSI-RS). If a spatial relation is not configured in frequency range 2 (FR2), the UE may determine spatial source. If example, in case CORESETs are configured on the component carrier (CC), the TCI state/QCL assumption of the control resource set (CORESET) may use the lowest identifier (ID). Alternatively, when any CORESETs are not configured on the CC, the activated TCI state with the lowest ID may be applicable to physical downlink shared channel (PDSCH) in the active DL-bandwidth part (BWP) of the CC.

A default spatial relation may be used for PUSCH scheduled by DCI format 0_0, where the UE determines spatial relation. For example, when there is no PUCCH resources configured on the active UL BWP CC, the default spatial relation may be the TCI state/QCL assumption of the CORESET with the lowest ID. Furthermore, the default pathloss RS may be the QCL-TypeD RS of the same TCI state/QCL assumption of the CORESET with the lowest ID. Alternatively, when there are no PUCCH resources configured on the active UL BWP CC in FR2 and in RRC-connected mode, the default spatial relation may be the TCI state/QCL assumption of the CORESET with the lowest ID. The default pathloss RS may be the QCL-TypeD RS of the same TCI state/QCL assumption of the CORESET with the lowest ID.

A unified TCI framework may include TCI states providing QCL assumptions for the reception of DL signals, and channels may be used to provide spatial sources for the transmission of UL signals and channels. Furthermore, repeaters may be an integral part of cellular deployments. For example, NR deployments tapping on new spectrum at higher bands in frequency range 1 (FR1) and frequency range 2 (FR2) may pose coverage challenges that repeaters may efficiently address.

Coverage is a fundamental aspect that may be considered in cellular network deployments. NR operations may rely heavily on new spectrum. For example, the majority of new bands are TDD and at higher frequencies (i.e., ~4 GHz for FR1 and above 24 GHz for FR2). New spectrum may also involve multi-antenna beamforming techniques (i.e., Massive MIMO for FR1) and/or analog beamforming for FR2. Network nodes for the in-band radio access can be categorized as full-stack gNBs, integrated access and backhaul (IAB) nodes enabling in-band self-backhauling, and/or RF repeaters.

IAB nodes may be a type of relay node building over the front-haul architecture with a dual "personality" consisting of distributed unit (DU) component, allowing the IAB node to appear as a regular cell to the UEs it serves, and a mobile terminal (MT) component connecting to its donor parent node(s) inheriting many properties of a regular UE.

An IAB node may be based on a Layer 2 architecture with end-to-end PDCP layer from donor IAB node to the UE for CP and UP. IAB nodes may also be classified as regenerative relays, with every packet traversing via the backhaul-link has to be properly decoded and re-encoded for transmission on the access link. Some IABs may assume that the half duplex operation between access and backhaul for Tx and Rx, while other IABs may enable full duplex implementations of IAB nodes.

Figure 2:
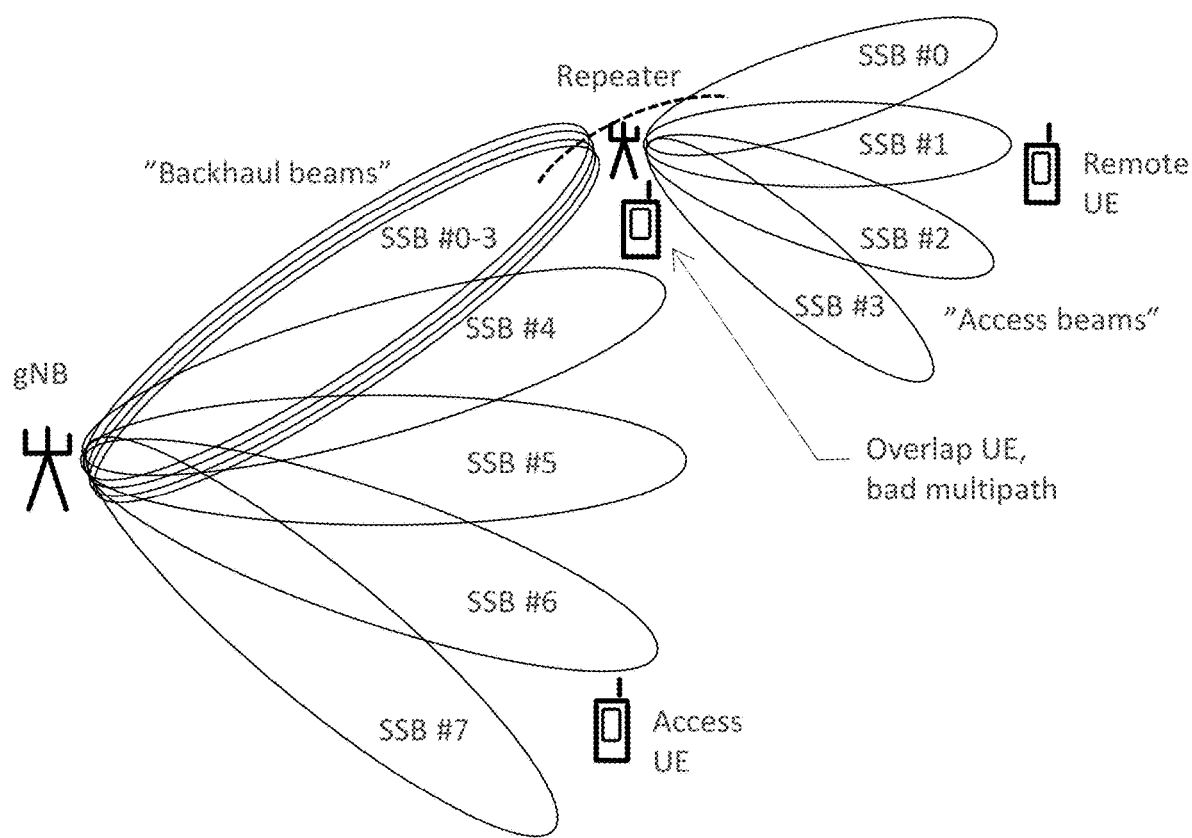
FIG. 2 illustrates an example deployment with a gNB and radio frequency (RF) repeater increasing the cell coverage with multi-beam capability over time.

RF repeaters may be a non-regenerative type of relay nodes that amplifies and forwards receive data without adaptive beamforming. There may be different categories of the repeaters depending on power characteristics and spectrums that they are configured to amplify (e.g., single band, multi-band, etc.). RF repeaters may be full-duplex capable, without differentiating UL and DL. RF repeaters may be low-cost, easy to deploy, and may not increase latency. RF repeaters may be a simple and cost-effective way to improve network coverage. However, RF repeaters may also amplify signal and noise, and may contribute to an increase of interference (pollution) in the system. One solution may be a smart repeater that can be adaptive in beam domain over time, as illustrated in FIG. 2. Specifically, SSB #0-3 beams may be transmitted from the gNB to the repeater, which uses different transmit beams for the different SSBs.

In general, extending beam management functionality to include inter-cell and repeater scenarios, new limitations, and restrictions needs to be taken into account. When the gNB switches the beam pair link for the UE associated with a repeater beam to the gNB beam, the timing of a received signal from the current beam under the repeater to the new beam directly under the gNB may be largely different. For example, FIG. 2 illustrates switching from SSB #3 (within the coverage of repeater) to SSB #4 or SSB #5 (towards the gNB coverage). In addition, the UE may also use different panels for the reception of the signal for the current beam and the new beam. Compared to a beam pair link switching between the beams transmitted by one transmitter (either gNB or repeater), the UE would need an additional RS, and thus, a longer time to complete the beam switching procedure where the completion includes a receiving panel being synchronized and ready to receive via the new beam pair link. In other words, some beam switches may require physical random access channel (PRACH) preamble transmission for the resynchronization uplink (UL), while some beam switches may be performed without any additional timing issues. The same may also occur when the repeater discussed above is replaced with a TRP that is either from a different or same cell as the gNB. In order to address these advantages, some example embodiments described herein may improve support different beam switch latency modes explicitly indicated by the gNB.

Certain example embodiments described herein may have various benefits and/or advantages to overcome the disadvantages described above. For example, certain embodiments may improve the reliability of beam switching with repeater deployments. Furthermore, no complex operation would be required for the gNB to apply certain example embodiments. Various example embodiments may further ensure that the success of the beam switching, despite anticipated larger step in timing, is maximised resulting in improved performance and connection quality. Thus, certain example embodiments discussed below are directed to improvements in computer-related technology.

Certain example embodiments described herein may facilitate efficient beam switching in 3GPP NR-based deployments in scenarios with intra-cell and inter-cell beam switching and repeaters, such as where inter-cell beam management is used in conjunction with intra-cell beam management. As a result, network entities (e.g., gNBs) may use L1/L2 signaling methods to command UEs to switch to receive downlink transmissions from non-serving cells, as well as to transmit uplink transmissions to non-serving cells in addition to the serving cell. Since RRC level reconfiguration/handover is not utilized, UEs may use fast beam switching between the transmission and reception points of different cells, thereby improving the overall mobility of the UEs. By using lower layer signaling, UEs may be switched in a fast manner from one TRP to another TRP, regardless of whether TRPs are from the same cell or not. This framework may also enable simultaneous beam pair links for the UE towards multiple TRPs (e.g., 2) where the TRPs can be from different cells; in particular, beam pair links between the gNB and UE may include gNB TX beams and UE RX beams in downlink, and gNB RX beams and UE TX beams in uplink. In general, beam management includes L1/L2 procedures, and signaling between the gNB and UE to keep gNB and UE TX and RX beams aligned during the connection.

Some example embodiments described herein may include a new beam pair link switch mechanism applicable for both DL and UL, where the gNB explicitly indicates which beam switching latency mode is applied. For example, a UE may receive a UL beam pair link switch command that indicates the UE which beam switching latency mode is applied.

In some example embodiments of a latency mode, the UE may perform beam switch without additional synchronization latency. In other example embodiments, the UE may measure the DL RS, such as synchronization signal block (SSB) and/or Non-Zero Power Channel Status Information Reference Signal (NZP-CSI-RS), for time and frequency tracking. In particular, this may be used for UE panel condition aware switching where the UE may have provided the gNB information via L1/L2 signaling regarding the source DL RSs (representing the candidate beam pair links) that would require additional latency and/or at least one measurement of the new target RS. This may also be used when the UE needs to switch to using the new panel in order to communicate in DL and/or UL via the new beam pair link (represented by the RS in the target TCI state).

In various example embodiments, latency mode may also be associated with a certain beam switching application time (latency). For example, the beam switching procedure may be similar or the same, but latency/application time may have different "latency modes." In addition, the UE may provide different latency modes based on the capability of the UE (e.g., shortest latency: latency mode[0]/application time [0]; intermediate latency: latency mode [1]/application time [1]; longest latency: latency mode [2]/application time [2]). When the UE reports DL RSs, the UE may tag one of these indices to the reported DL RS (e.g., DL RS #n, L1-RSRP value, latency mode 0; DL RS #t, L1-RSRP value, latency mode 2). The UE may also provide capabilities and/or reporting separately for DL and UL. Explicit indications about latency mode and/or beam switching mode may be common for DL and UL, or differ for DL and UL.

In certain example embodiments, the UE may be provided (dedicated) PRACH preambles (PDCCH order) in the beam switch command; this latency mode may also include transmitting the preamble and/or receiving a response from the gNB. In particular, this may be used for the UL beam pair link switching where the gNB determines first that the repeater introduces non-zero additional latency that cannot be compensated by the UE autonomously in the beam pair links and/or the timing difference between source and target TRP is too large for the UE to autonomously adjust timing. The beam pair link switch may be confirmed to be completed when the UE receives PDCCH (e.g., random access response) for the transmitted PRACH preamble.

In various example embodiments, the UE may embed into L1-reference signal received power (RSRP) reporting information for each reported DL RS that would require a latency mode from the UE if the current serving beam (which may be represented as the current indicated common TCI state) is switched to a beam represented by the reported DL RS. Using this information, the gNB may become aware of which beam switching latency mode to apply for each possible beam switch (from current to a new one represented by the reported DL RS). Furthermore, the UE may estimate the need for PRACH preambles by comparing the received timings of the RS representing the current indicated common TCI state, and selected RSs for the reporting or whether the UE could autonomously adjust the UL timing without the need for PRACH preamble in the beam switching.

In addition, the gNB may apply the command whenever the UE is moving between the "repeater beams" (e.g., beam #0-3 in FIG. 2) to beams directly connecting to the gNB itself. The gNB may be assumed to distinguish between the two sets of beams as it may be configured by operation and maintenance (OAM).

The techniques discussed below may be applied for intra-cell multi-TRP, inter-cell multi-TRP (e.g., M-DCI mTRP), inter-cell beam management (e.g., S-DCI mTRP), and/or intra-cell repeater.

Figure 3:
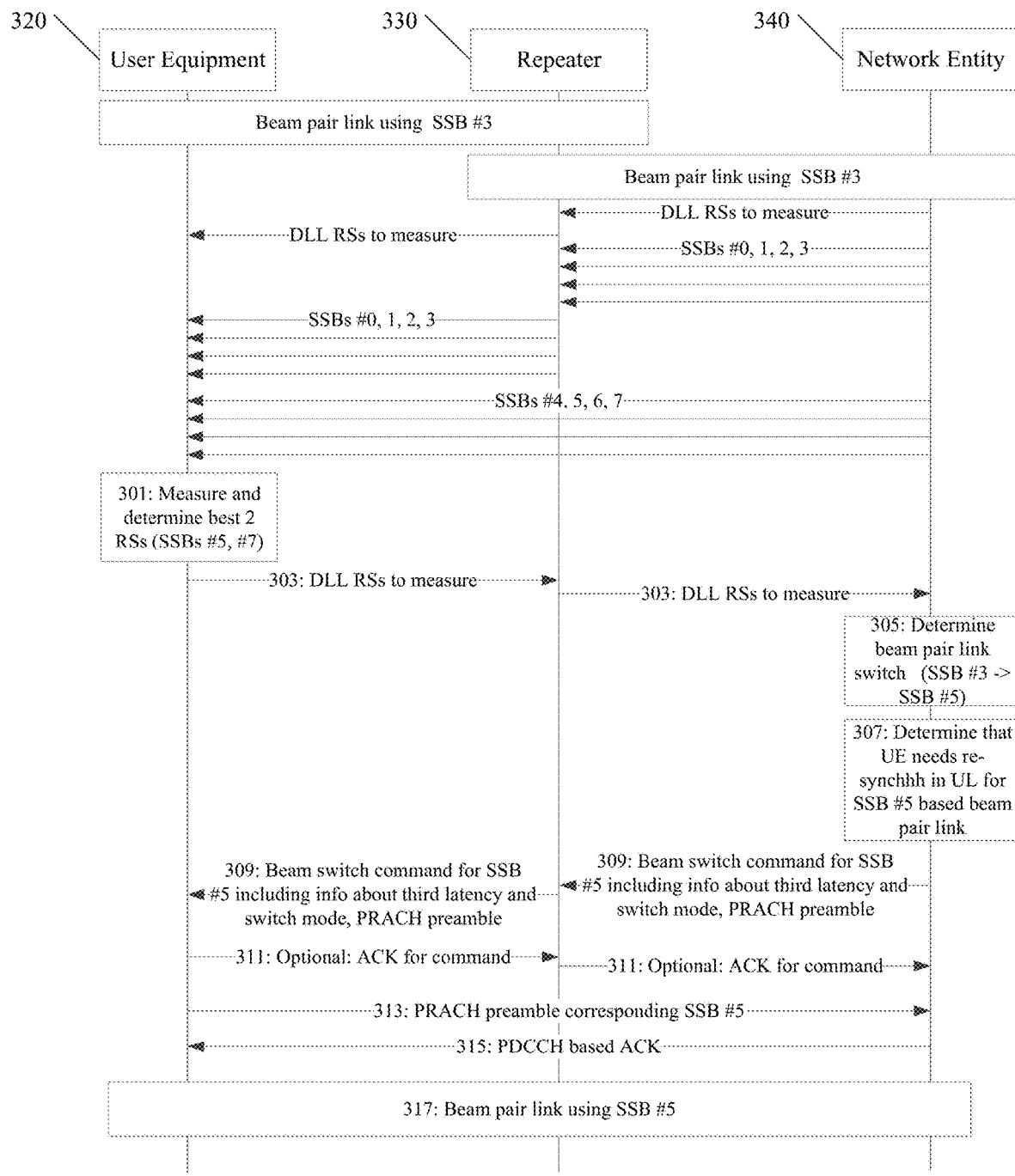
FIG. 3 illustrates an example of a signaling diagram, according to certain example embodiments.
Figure 5:
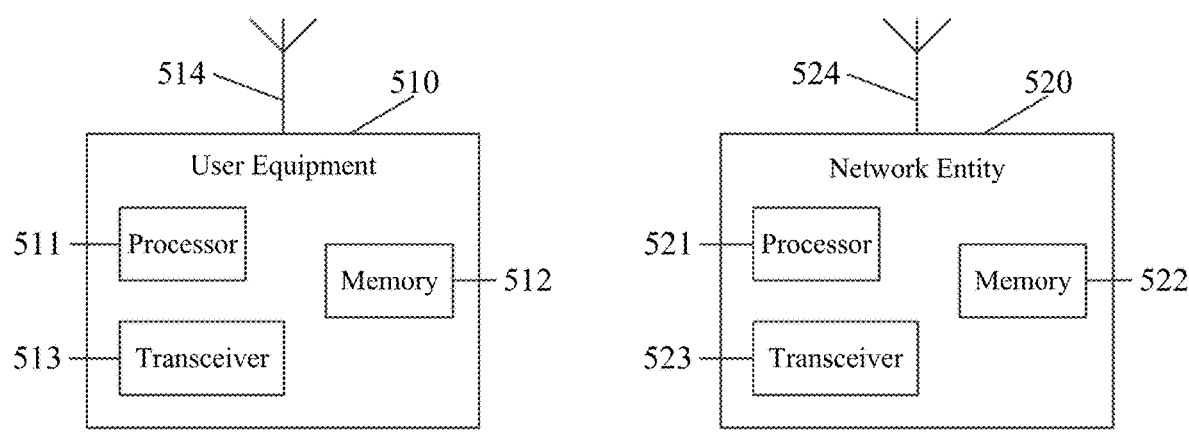
FIG. 5 illustrates an example of various network devices, according to some example embodiments.

FIG. 3 illustrates an example of a signaling diagram depicting how to facilitate explicit latency mode determination in beam switching, according to certain example embodiments. UE 320, repeater 330, and network entity 340 may be similar to UE 510 and NE 520, as illustrated in FIG. 5, according to certain example embodiments.

At 301, UE 320 may measure at least one configured DL RS (e.g., SSB) for at least one candidate beam pair link for DL and/or UL. At 303, UE 320 may report the N best DL DLs of the measured DL RSs to repeater 330, which may be further transmitted to NE 340. In some example embodiments, UE 320 may transmit information indicating whether UE 320 could autonomously adjust UL timing if beam switching happened to the RS and/or that additional preamble would be needed (switching mode 3).

At 305, NE 340 may determine at least one beam pair link switch (e.g., SSB #3→SSB #5), and at 307, NE 340 may determine that UE 320 needs re-synchronization UL for SSB #5 based upon beam pair links. NE 340 may determine the need for the PRACH preamble transmission for UE 320 in the beam switching, (i.e., for applying the third latency and beam switching mode above by evaluating the current TA under repeater and a step in the TA values for the UEs under repeater compared to the UEs directly under NE 340.)

At 309, NE 340 may transmit to repeater 330 at least one beam switch command for SSB #5 including information about the latency, switch mode, and/or PRACH preamble, which may then be transmitted to UE 320. In certain example embodiments, the at least one beam switch command may be transmitted in a MAC CE or in DCI transmitted on PDCCH. In response, UE 320 may determine a latency and switching mode.

In certain example embodiments, UE 320 may determine a first latency and switching mode which corresponds in latency with the known TCI state as a target TCI (i.e., UE 320 may receive at least one explicit indication that beam switching is according to a known TCI state).

In some example embodiments, UE 320 may determine a second latency and switching mode which corresponds in latency with an unknown TCI state as the target TCI state (i.e., UE 320 may receive explicit indications that beam switching is according to an unknown TCI state).

In various example embodiments, UE 320 may read PRACH preamble index/indices, and determine the associated SSB being the one that QCL'ed in QCL-TypeD sense with the QCL-TypeD RS of the target TCI state provided in the command. In some example embodiments, NE 340 may determine the need for the PRACH preamble transmission for UE 320 in the beam switching, i.e. by evaluating the current TA under repeater and a step in the TA values for the UEs under repeater 330 compared to the UEs directly under NE 340.

Furthermore, the enhanced command for the beam switch may be applied when UE 320 is moving from the coverage (and beams) of repeater 330 to the coverage of NE 340. Thus, there can be a larger step in timing requiring appropriate synchronization—applied and triggered by the indication about the latency mode.

At 311, upon determining the associated SSB, UE 320 may transmit to repeater 330 at least one optional acknowledgement (HARQ-ACK) command, which may be transmitted to NE 340.

At 313, UE 320 may transmit to NE 340 at least one PRACH preamble corresponding with SSB #5, and at 315, NE 340 may transmit to UE 320 at least one PDCCH based acknowledgement. Furthermore, UE 320 may monitor for a random access response from NE 340 on PDCCH assuming the target TCI state.

At 317, UE 320 may determine at least one beam switching mode based on the at least one beam switch command. Furthermore, UE 320 may receive DCI on PDCCH which confirms the beam switching. UE 320 may also receive a timing advance in the DCI or in the scheduled PDSCH.

Figure 4:
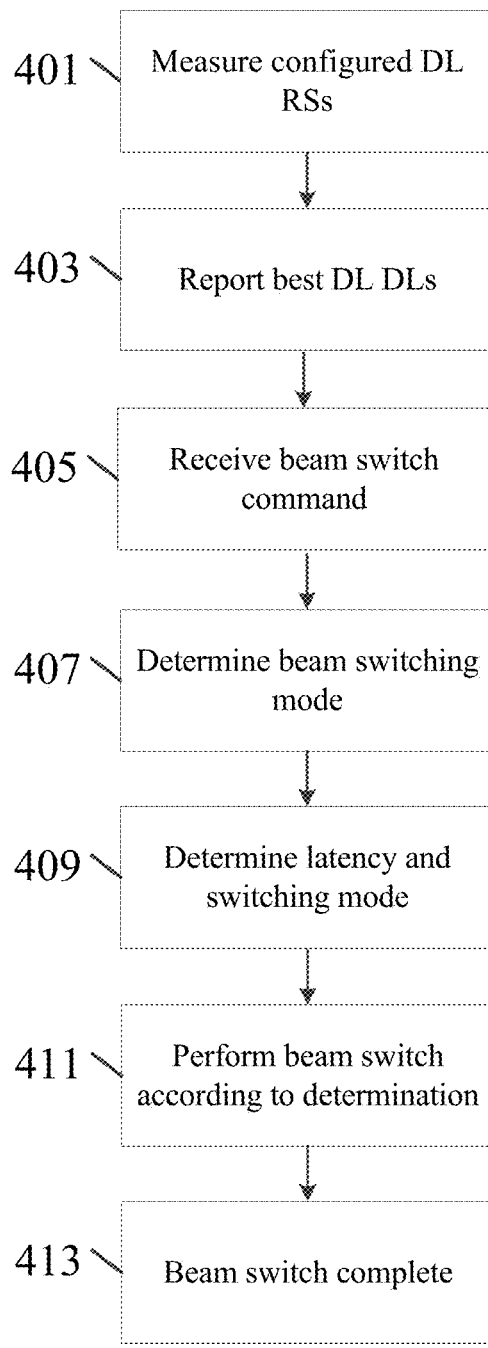
FIG. 4 illustrates an example of a flow diagram of a method, according to various example embodiments.

FIG. 4 illustrates an example of a flow diagram of a method that may be performed by a UE, such as UE 510 illustrated in FIG. 5, according to various example embodiments.

At 401, the UE may measure at least one DL RS, which may be a SSB, for candidate beam pair links for DL and/or UL.

At 403, the UE may report the N-best DL DLs of the measured DL RSs. In some example embodiments, the UE may also add information whether the UE would be able adjust autonomously UL timing if beam switch happened to the RS and/or an additional preamble would be needed.

At 405, the UE may receive at least one beam switch command from the NE, such as NE 920 illustrated in FIG. 9. For example, the report may be carried in a MAC CE or DCI transmitted on PDCCH.

At 407 and 409, the UE may determine at least one beam switching mode based upon the at least one beam switch command. At 409, the at least one beam switching mode may be a first latency and switching mode, which may correspond based on latency the same as with known TCI state as a target TCI state. The UE may receive at least one explicit indication that beam switching is according to known a TCI state.

In certain example embodiments, the switch may correspond based upon latency with an unknown TCI state as a target TCI state. Thus, the UE may receive explicit indications that beam switching is according to an unknown TCI state.

In various example embodiments, the UE may read PRACH preamble index/indices and/or determine the associated SSB being the one that QCLed in QCL-TypeD sense with the QCL-TypeD RS of the target TCI state provided in the command. The UE may then transmit an acknowledgement (HARQ-ACK) for the command, and transmit (dedicated) PRACH preambles in the determined RACH occasion associated with the determined SSB. The UE may also monitor for a random access response from the NE on PDCCH assuming the target TCI state, and receive DCI on the PDCCH which confirms the beam switching. The UE may also receive a timing advance in the DCI or in the scheduled PDSCH.

At 411, the UE may perform beam switching according to the determination, and at 413, the UE may determine that the beam switching is complete.

FIG. 5 illustrates an example of a system according to certain example embodiments. In one example embodiment, a system may include multiple devices, such as, for example, UE 510 and/or NE 520.

UE 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 520 may be one or more of a base station, such as an eNB or gNB, a serving gateway, a server, and/or any other access node or combination thereof. Furthermore, UE 510 and/or NE 520 may be one or more of a citizens broadband radio service device (CBSD).

NE 520 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 510 and/or NE 520 may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 512 and 522. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 511 and 521, memories 512 and 522, and any subset thereof, may be configured to provide means corresponding to the various blocks of FIGS. 3-4. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple RATs. Other configurations of these devices, for example, may be provided. Transceivers 513 and 523 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 3-4). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 3-4. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 6:
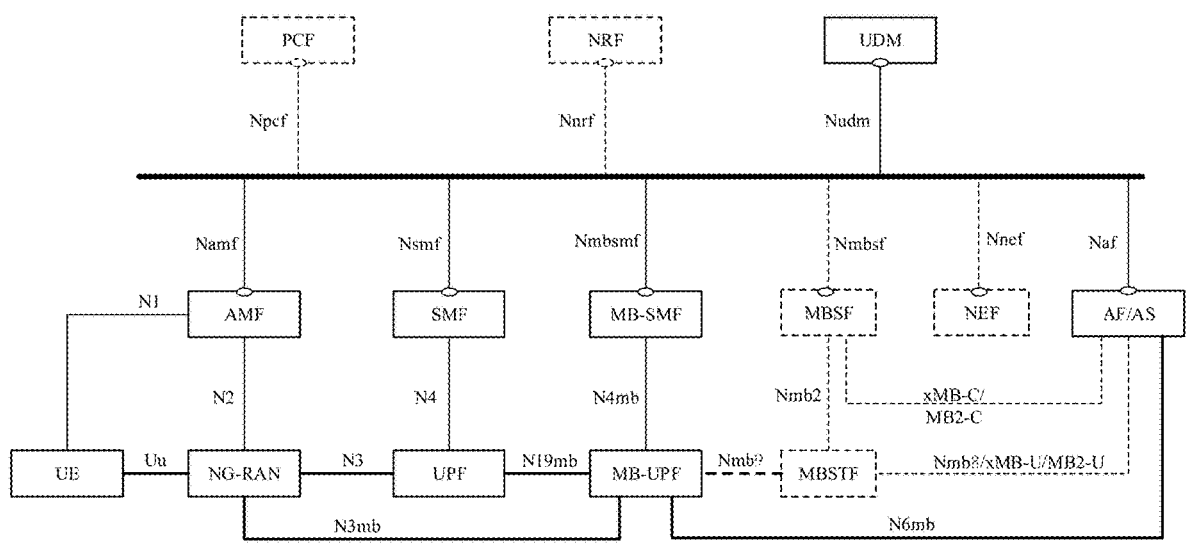
FIG. 6 illustrates an example of a 5G network and system architecture, according to certain example embodiments.

FIG. 6 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 6 may be similar to UE 510 and NE 520, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

According to certain example embodiments, processor 511 and memory 512 may be included in or may form a part of processing circuitry or control circuitry. In addition, in some example embodiments, transceiver 513 may be included in or may form a part of transceiving circuitry.

For instance, in certain example embodiments, apparatus 510 may be controlled by memory 512 and processor 511 to receive at least one beam switch command from at least one network entity, determine at least one latency and switching mode, and perform the determined at least one latency and switching mode.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving at least one beam switch command from at least one network entity, determining at least one latency and switching mode, and performing the determined at least one latency and switching mode.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

3GPP Third Generation Partnership Project
5G Fifth Generation
5GC Fifth Generation Core
5GS Fifth Generation System
5QI Fifth Generation Quality of Service Indicator
ACK Acknowledgement
AMF Access and Mobility Management Function
ARQ Automatic Repeat Request
ASIC Application Specific Integrated Circuit
BS Base Station
BWP Bandwidth Part
CAPC Channel Access Priority Class
CBSD Citizens Broadband Radio Service Device
CC Component Carrier
CE Control Element
CN Core Network
CORESET Control Resource Set
CPU Central Processing Unit
CSI-RS Channel State Information Reference Signal
CU Centralized Unit
DCI Downlink Control Information
DL Downlink
DU Distributed Unit
eMBB Enhanced Mobile Broadband
eMTC Enhanced Machine Type Communication
eNB Evolved Node B
EPS Evolved Packet System
FR Frequency Range
gNB Next Generation Node B
GPS Global Positioning System
HARQ Hybrid Automatic Repeat Request
HDD Hard Disk Drive
IAB Integrated Access and Backhaul
L1 Layer 1
L2 Layer 2
LTE Long-Term Evolution
LTE-A Long-Term Evolution Advanced
MAC Medium Access Control
MCS Modulation and Coding Scheme
MEMS Micro Electrical Mechanical System
MIMO Multiple Input Multiple Output
MME Mobility Management Entity
mMTC Massive Machine Type Communication
MPDCCH Machine Type Communication Physical Downlink Control Channel
MT Mobile Terminal
MTC Machine Type Communication
NAS Non-Access Stratum
NB-IoT Narrowband Internet of Things
NE Network Entity
NG Next Generation
NG-eNB Next Generation Evolved Node B
NG-RAN Next Generation Radio Access Network
NR New Radio
NR-U New Radio Unlicensed
NZP-CSI-RS Non-Zero Power Channel Status Information Reference Signal
OAM Operation and Maintenance
PDA Personal Digital Assistance
PBCH Physical Broadcast Channel
PDCCH Physical Downlink Control Channel
PDCP Packet Data Convergence Protocol
PDSCH Physical Downlink Shared Channel
PRACH Physical Random Access Channel
PUCCH Physical Uplink Control Channel
PUSCH Physical Uplink Shared Channel
QCL Quasi Co-location
QoS Quality of Service
RAM Random Access Memory
RAN Radio Access Network
RAT Radio Access Technology
RE Resource Element
RLC Radio Link Control
RRC Radio Resource Control
RS Reference Signal
RSRP Reference Signal Received Power
Rx Receiving
SMF Session Management Function
SRS Sounding Reference Signal
SSB Synchronization Signal Block
TA Timing Advance
TCI Transmission Coordination Indication
TRP Transmission Point
Tx Transmission
UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

What is claimed is:

1. A method, comprising:
receiving, by a user equipment and from a network entity, a beam switch command comprising an indication of a latency mode associated with beam switching, wherein the latency mode is one of a plurality of latency modes comprising a first latency mode associated with beam switching according to at least one known transmission coordination indication state and a second latency mode associated with beam switching according to at least one unknown transmission coordination indication state; and
performing beam switch based on the latency mode associated with beam switching.

2. The method of claim 1, further comprising:
measuring, by the user equipment, at least one downlink reference signal configured for at least one candidate beam pair link for at least one of downlink or uplink.

3. The method of claim 2, wherein the at least one downlink reference signal comprises at least one synchronization signal block.

4. The method of claim 1, wherein the plurality of latency modes associated with beam switching further comprises a third latency mode associated with beam switching, in the third latency mode associated with beam switching the beam switch is performed based on at least one physical random access channel preamble index received in the beam switch command.

5. The method of claim 1, wherein performing beam switch based on the latency mode associated with beam switching comprises in a latency mode associated with beam switching, performing beam switch without additional synchronization latency.

6. The method of claim 1, wherein performing beam switch based on the latency mode associated with beam switching comprises in a latency mode associated with beam switching, measuring at least one downlink reference signal.

7. The method of claim 1, further comprising:
reporting, by the user equipment and toward the network entity, measurement results comprising an indication of a latency mode associated with beam switching.

8. An apparatus, comprising:
at least one processor; and
at least one memory including computer program code, wherein the at least one memory and the computer program code are configured to, with the at least one processor, cause the apparatus at least to:
receive, from a network entity, a beam switch command comprising an indication of a latency mode associated with beam switching, wherein the latency mode is one of a plurality of latency modes comprising a first latency mode associated with beam switching according to at least one known transmission coordination indication state and a second latency mode associated with beam switching according to at least one unknown transmission coordination indication state; and
perform beam switch based on the latency mode associated with beam switching.

9. The apparatus of claim 8, wherein the at least one memory and the computer program code are further configured to, with the at least one processor, cause the apparatus at least to:
measure at least one downlink reference signal configured for at least one candidate beam pair link for at least one of downlink or uplink.

10. The apparatus of claim 9, wherein the at least one downlink reference signal comprises at least one synchronization signal block.

11. The apparatus of claim 8, wherein the plurality of latency modes associated with beam switching further comprises a third latency mode associated with beam switching, in the third latency mode associated with beam switching the beam switch is performed based on at least one physical random access channel preamble index received in the beam switch command.

12. The apparatus of claim 8, wherein performing beam switch based on the latency mode associated with beam switching comprises in a latency mode associated with beam switching, performing beam switch without additional synchronization latency.

13. The apparatus of claim 8, wherein performing beam switch based on the latency mode associated with beam switching comprises in a latency mode associated with beam switching, measuring at least one downlink reference signal.

14. The apparatus of claim 8, wherein the at least one memory and the computer program code are further configured to, with the at least one processor, cause the apparatus at least to:
report, toward the network entity, measurement results comprising an indication of a latency mode associated with beam switching.

15. An apparatus, comprising:
at least one processor; and
at least one memory including computer program code, wherein the at least one memory and the computer program code are configured to, with the at least one processor, cause the apparatus at least to:
transmit, toward a user equipment, a beam switch command comprising an indication of a latency mode associated with beam switching, to enable the user equipment to perform beam switch based on the latency mode associated with beam switching, wherein the latency mode is one of a plurality of latency modes comprising a first latency mode associated with beam switching according to at least one known transmission coordination indication state and a second latency mode associated with beam switching according to at least one unknown transmission coordination indication state.

16. The apparatus of claim 15, wherein the plurality of latency modes associated with beam switching further comprises a third latency mode associated with beam switching, in the third latency mode associated with beam switching the beam switch is performed based on at least one physical random access channel preamble index received in the beam switch command.

17. The method of claim 1, wherein the beam switch command is received in downlink control information (DCI) or medium access control (MAC) control element (CE).

18. The method of claim 4, wherein the latency mode indicated in the beam switch command is the third latency mode associated with beam switching when the user equipment is moving from the coverage of a repeater to the coverage of the network entity.

19. The apparatus of claim 8, wherein the beam switch command is received in downlink control information (DCI) or medium access control (MAC) control element (CE).

20. The apparatus of claim 11, wherein the latency mode indicated in the beam switch command is the third latency mode associated with beam switching when the apparatus is moving from the coverage of a repeater to the coverage of the network entity.

\* \* \* \* \*